June 2, 1970 E. C. LETTER 3,515,880

RADIATION SENSITIVE RECORDING SYSTEM USING SOLID STATE ELECTROLYTIC LAYER

Filed March 20, 1967 2 Sheets-Sheet 1

EUGENE C. LETTER
INVENTOR.

BY Lowell G. Wise
ATTORNEY

EUGENE C. LETTER
INVENTOR.

BY Lowell G. Wise
ATTORNEY

United States Patent Office

3,515,880
Patented June 2, 1970

3,515,880

RADIATION SENSITIVE RECORDING SYSTEM USING SOLID STATE ELECTROLYTIC LAYER

Eugene C. Letter, Penfield, N.Y., assignor to Bausch & Lomb Incorporated, Rochester, N.Y., a corporation of New York Filed Mar. 20, 1967, Ser. No. 624,330
Int. Cl. H01l *17/00*
U.S. Cl. 250—213 18 Claims

ABSTRACT OF THE DISCLOSURE

A solid state multi-layer optical device having a photoconductive layer in contact with an electrolytic layer containing reducible metal ions in a solid matrix. Transparent electrodes apply electromotive force to the electrolytic layer through radiation sensitized areas of the photoconductive layer whereupon valence changes in the metal ions result in reversible changes in the optical density of the device.

This invention relates to electro-optical devices containing solid state ionic conducting materials in which an electron-reducible ion present in a solid matrix changes valence reversibly in response to a low voltage electrical potential applied across the ionic conductor. Normally transparent ionic layers become opaque due to the formation of metallic non-transmitting areas by electrolysis in the matrix adjacent to a negative electrode.

By interposing a photoconducting material between the ionic layer and a transparent electrode, reduction of the metal ion in the matrix becomes a function of the amount of radiation incident on the photoconducting material.

The change in optical and electrical properties caused by applying an electrical potential across the ionic conductor layer and photoconducting layer remains after the potential is removed, but can be reversed by exposing the photoconductor to radiation and shorting the external circuit or reversing the applied potential. Another advantage is that a pattern can be developed in these elements in less than a second.

The fluorides of lead, cerium and lanthanum contained in a matrix of glass or crystal have been described in my copending U.S. patent application Ser. No. 525,620, filed Feb. 7, 1966. The preferred ionic conducting compositions are lead fluoride or glasses having the following mol ratios:

$PbO$, .024 to 2; $PbF_2$, 0.125 to 1; $SiO_2$, 0 to 1; and $B_2O_3$, 0 to 0.5.

For example, the glass may contain $$PbO\cdot(0.5)PbF_2\cdot SiO_2,\ PbO(0.5)PbF_2\cdot(0.5)B_2O_3$$

or $PbO\cdot(0.5)PbF_2\cdot(0.5)SiO_2\cdot(0.25)B_2O_3$. The compositions have reducible cations and mobile conducting anions in the solid matrix. The intermediate valence state $Pb^{+2}$ in the unenergized ionic conductor is oxidized to the higher $Pb^{+4}$ valence at the positive electrode, and reduced to the lower $Pb^0$ valence at the negative electrode. Current is carried by the $F^-$ ion, which is mobile in the matrix at the operating temperature of the cell. This is essentially an electrochemical phenomenon, and electrical neutrality is maintained by migration of the fluoride ion toward the positive electrode. The positions and valences for the energized state of the cell can be stable for long periods of time after the polarizing E.M.F. is removed, and the cell actually stores a D-C charge, which may be dissipated by providing an electron path between the positive and negative electrodes. The change in optical density is clearly visible and it is generally attributed to the metallic Pb in the matrix adjacent the negative electrode. Small changes in the optical properties may be enhanced by optical interference effects.

Nurerous materials acn be used as the electron conducting members of the electrochemical cell. Where high visible light transmission is required, tin oxide is desirable. Other electrode materials include Ag, Au, Cu, $CdF_2$, NiO and $In_2O_3$. The electrodes should be selected to avoid detrimental chemical reactions between adjacent layers.

The selection of a photoconducting material is dependent on the desired spectral ranges of energizing radiation and transmitted radiation. Selenium conducts electrons when exposed to visible rays. Germanium is responsive to infrared rays. Numerous semiconductors such as PbO, are photoconductors. Certain combinations of matrix layers and electrode layers can produce a P–N junction. Such junctions can result in photoconducting properties without the need for an intermediate photoconductor between the matrix and the electrode.

The electro-opitcal properties of solid state devices according to this invention may be used in several ways. In the energized state the change in valence of the metal in the matrix develops a stable electromotive force in the cell. The metal ion is incorporated into the matrix in an intermediate valence state. With higher and lower valence states available, the respective reduction and oxidation reactions are produced electrolytically without a change in physical state of the reactants. The developed E.M.F. is a function of the incident radiation on the photoconductor and the amount of electrical potential for energizing the cell. The change in valence also produces an increase in the absorption of visible and near-visible radiation and a change in refractive index of the matrix material. For many solid state devices of this invention, these properties return to their original values when the cell is short-circuited. This may be accomplished by exposing the photoconductor to energing radiation and closing a switch to connect the electrodes. Also, self-reversal by internal shorting has been observed at elevated temperatures. During reversal, the stored E.M.F. is dissipated and the matrix reurns to its normal transparent state.

The electromagnetic radiation incident upon the photoconductor may be image rays focused on the solid state device by a lens system. Also, data information in the form of a light pattern may be sensed and stored by such devices while relatively thick films of 10 microns or more are desirable in many multi-layer devices, the electrochemical phenomena have been observed in extremely thin matrix films, i.e. about one micron or less, and this is quite advantageous for high-speed and low-temperature devices.

Accordingly, it is an object of this invention to provide novel solid state electro-optical apparatus and methods. In particular, a multi-layer solid state photoconductor between the matrix and the electrode.

The electro-optical properties of solid state devices according to this invention may be used in several ways. In the energized state the change in device has been found which possesses unique properties useful for recording images and data. It is an object of this invention to provide a novel method for recording a pattern of invisible waves by selectively darkening a solid matrix material in response to the invisible waves and an electrical potential with readout of the recorded pattern by visible waves. It is another object to develop an electromotive force in selected portions of the solid state matrix as a function of applied potential and incident radiation. These and other objects and advantages of the invention will be understood from the following description and in the drawing, wherein:

Figure 1:
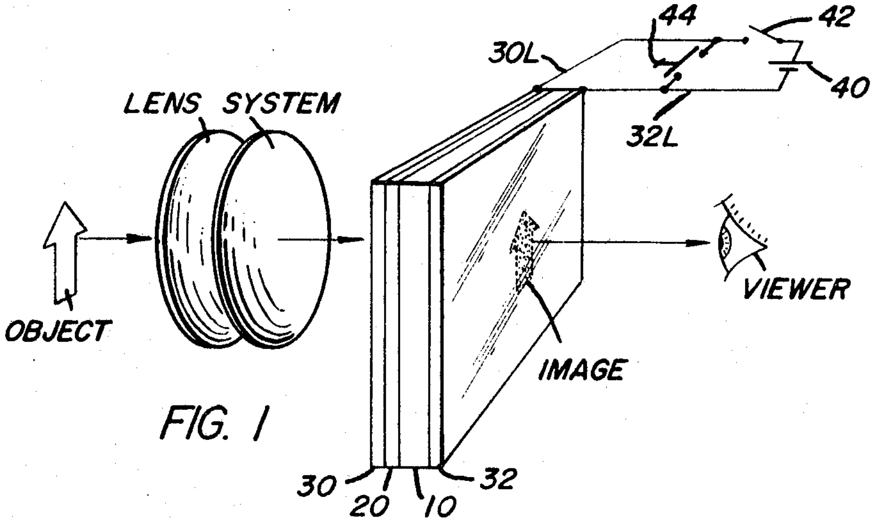
FIG. 1 is a schematic perspective showing a typical photoconductive opacifiable matrix and the development of a visible negative image.

A typical image recording system is shown in FIG. 1. A multi-layer device comprising a reactive matrix 10, with a layer of photoconducting material 20 contacting the matrix 10 is electrically energized through electronic conducting transparent layers 30 and 32. These electrodes are connected through leads 30L and 32L to a source of electrical potential, such as battery cell 40, through switch 42. Reversal of the electrochemical phenomena is effected through a shorting switch 44. In operation light rays from an object are directed toward the photoconductor layer 20 by a lens system. The photoconductor layer 20 conducts electrons in those portions of that layer where incident radiation passes through the transparent electrode 30. The multi-layer is biased electrically by closing switch 42, and an opaque image is formed during energization of the device. When irradiation of the photoconductor 20 is ceased or the electrical circuit opened, the image is retained in the matrix 10. The optical density of the energized areas is dependent upon the voltage of the electrical source 40, current density, the response of the photoconductor layer 20 to the incident rays, and the duration of the energizing process.

There are several ways to view the negative image in the energized matrix 10. Light transmitted through the multi-layer is partially blocked in those portions which have been darkened by the electrochemical process, and this can be directly observed by the viewer. Also, the reflection of light incident from the direction of electrode 32 is a method for viewing the image. Contract printing of a photographic sheet or a second photosensitive reactive multilayer according to this invention will provide a positive print of the image. Enlargement or reduction of the image may be achieved by such processes.

To erase the image in matrix layer 10, an electron path is provided by closing switch 44 and rendering layer 20 conductive, as by a uniform exposure of the layer 20 to light to which the photoconductor responds. The device may be reused indefinitely for other image-forming processes. The step of viewing of the image may utilize magnification.

Figure 2:
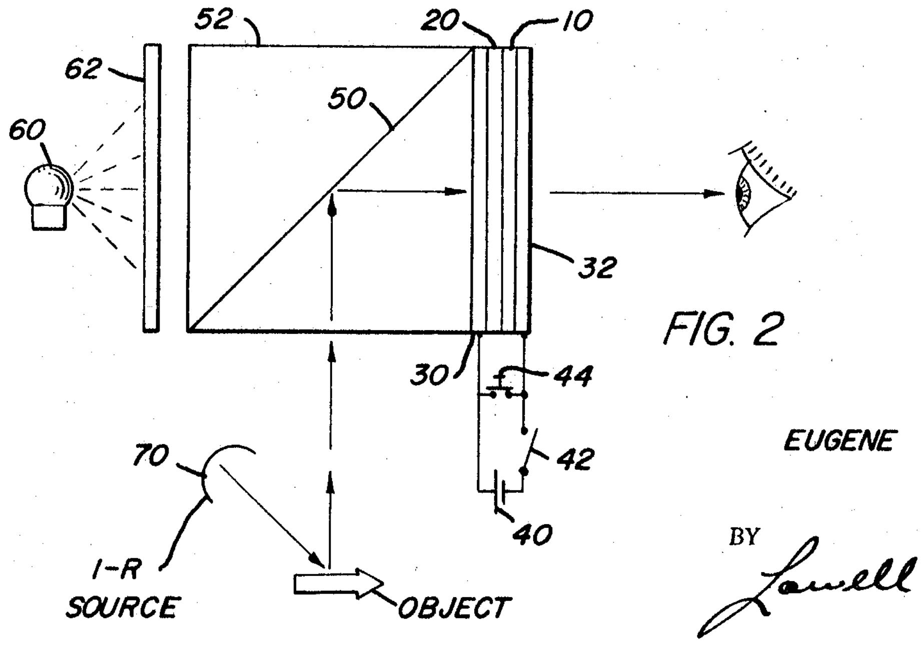
FIG. 2 is a schematic view of apparatus for developing an image with infrared light and viewing the image with visible light.

One of the more important uses to which the above phenomenon can be put is the formation of a pattern in the matrix by one spectral range and viewing of the pattern with a second spectral range. A practical system for wavelength conversion is realized in this manner. By proper selection of materials for the electrodes, matrix and photoconductor, the device can be energized in response to invisible rays, such as infrared or ultraviolet, and the resulting pattern viewed with visible light. Such a system is depicted in FIG. 2. The reactive matrix 10 is energized by electrons conducted through electrodes 30, 32 and photoconductor layer 20 from cell 40. This is a similar construction to that of FIG. 1. A partially transmitting mirror 50 is held in a fixed relation to the multilayer device by a transparent cube 52, diagonally split to mount the film 50. Light from a visible source 60 is distributed by a diffusion plate 62 to illuminate uniformly the reactive matrix and its adjacent layers. Infrared rays from an object, usually reflected from a source 70 of infrared radiation, are directed toward mirror film 50 and reflected to the photoconducting layer 20 which is responsive to the invisible I-R rays. Switch 42 is closed to energize the matrix 10 in those areas adjacent the irradiated photoconducting layer. A negative image of the object is developed which image can be viewed by disconnecting switch 42 and illuminating the matrix from light source 60. Film 50 may be a partially metallized layer, or can be a selective interference multifilm which transmits the visible range while reflecting the invisible range. For the paritcular system geometry shown in FIG. 2, the electrode 30 and photoconductor 20 must be transparent to visible rays while responsive to I-R rays. An ordinary incandescent lamp contains sufficient wavelengths to effect reversal of the matrix image by exposing the matrix while shorting the circuit through switch 44.

Where one desires to use a photoconductor which is responsive to infrared rays, but opaque to visible rays, the image can be viewed by reflection from the rear side. An independent source of infrared radiation is not needed where the object emits sufficient radiation to energize the photoconductor.

Figure 3:
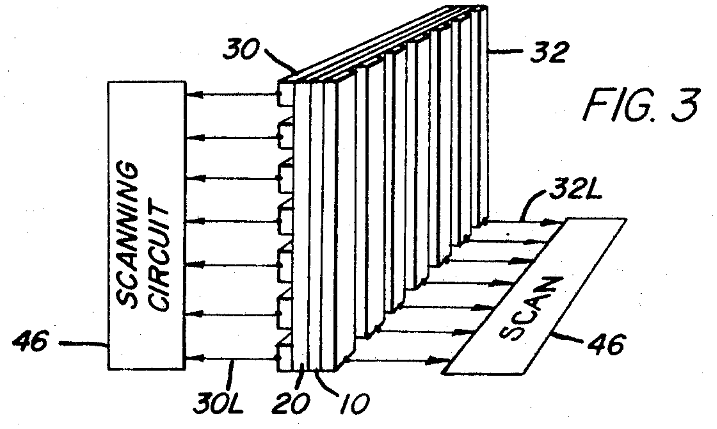
FIG. 3 shows a perspective view of an electrical storage and scanning device.
Figure 4:
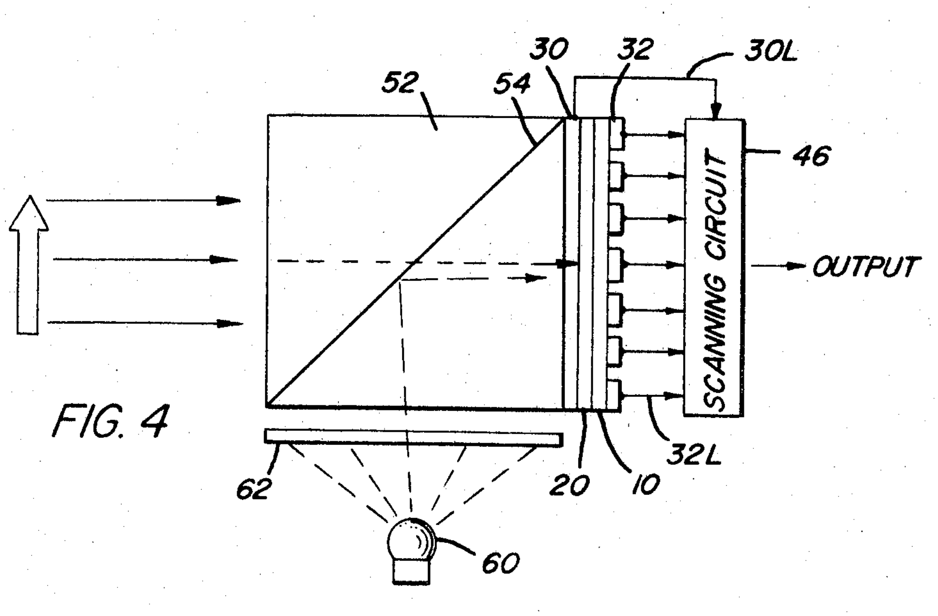
FIG. 4 shows a modification of an image scanning system.

The changes in electrical properties of the energized matrix may also be used to measure the amount of radiation incident on the photoconductive surface. Devices utilizing this phenomenon are shown in FIGS. 3 and 4. Contiguous layers of coordinate electrodes are coated on opposite sides of a photoconductive multilayer 10, 20. The horizontal bar-shaped parallel electronic conductors 30 form the X-axis, and the vertical bar-shaped conductors 32 form the Y-axis transverse to the X-axis. Through electrical leads 30L and 32L, the electro-optical storage device is connected with means for biasing the matrix 10 and photoconductor 20, and the same leads may be used for readout of the electrical charge by a scanning circuit 46 having means for measuring the developed potential in the storage device.

In operation, light rays form a pattern at the photoconducting layer 20 by passing through a partially metallized mirror 54 supported on a diagonally split cube 52. Horizontal electrodes 30 are transparent to this radiation wavelength; but the rear electrodes 32 and matrix 10 need not be transparent. The matrix layer 10 is energized by electrically biasing the individual portions of the layer simultaneously or sequentially during irradiation of the multi-layer device. After the optical pattern is recorded in a discrete electrical pattern, the electrolytic reaction is terminated by opening the electrical biasing circuit or interrupting the light from the source of the pattern. By connecting the leads to the individual electrode bars 30L and 32L in time sequence, the stored energy in portions of the matrix 10 can be scanned and transposed to a readout device or recorded on magnetic tape for later use. The photoconductor layer 20 is illuminated uniformly by light source 60 during readout.

There are several valuable properties of the photosensitive electrochemical storage device shown in FIGS. 3 and 4. The stored energy has an electrical potential developed as a function of the amount of incident radiation in the discrete areas of the multi-layer and a function of the applied electrical potential from the electrical biasing means. The developed potential in the matrix has excellent shelf life, in contrast with known photoresponsive electrical transducers which require immediate readout of a relatively unstable condition. This ability to store a photon-energized signal in the transducer itself is analogous to properties of other transducers which convert magnetic flux to stored electrical signal with subsequent readout.

The function of this electro-optical element as a data storage and transducing device has many uses. It is easily erased by short-circuiting the electrodes simultaneously with irradiation, thus reversing the electrochemical reactions in the matrix. Where the matrix layer is very thin, energizing, scanning and reversing the reactive matrix can be performed at high speed. This is valuable for memory devices in data processing.

Multi-layer devices containing more than one reactive layer are within the inventive concept. The energizing of one or more solid state matrix by selectively biasing the electrodes independently of other matrix-photoconductor combinations in the same multi-layer unit is therefore possible. In such devices, the same optical system can be used for actuating different matrixes for numerous functions.

The manufacture of electro-optical elements according to this invention can utilize numerous alternative operations. Where thin films are desirable, the coatings of matrix material, photoconductor, insulating material and electron conductors can be deposited by sputtering, thermal decomposition, vacuum evaporation, electrolysis plating and numerous other coating techniques. These methods permit masking of a substrate and applied coatings to obtain the desired pattern or arrangement for each layer in the element. In certain embodiments of the invention, commercially available substrates having an electron conducting transparent coating may be used. For instance, silicate glass coated with a uniform layer of tin oxide and having a uniform film resistance of about 50 to 10K ohms per square can be used in several electro-optical elements according to this invention.

Figure 5:
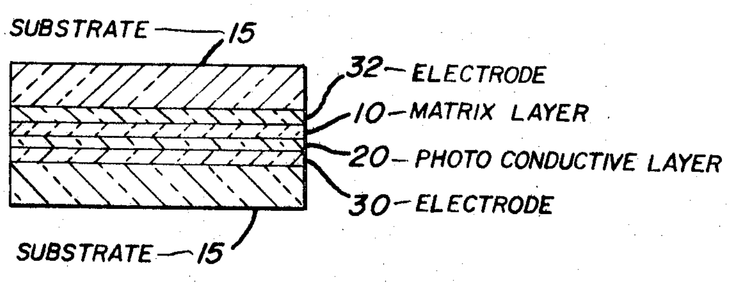
FIG. 5 and FIG. 6 are cross-sectional views of multilayer electro-optical elements, the film thicknesses shown therein being generally exaggerated in the drawings.

A typical laminated reactive element is shown in FIG. 5, where a sandwich structure is made from two glass substrates 15 having electrodes 30 and 32 coated thereon, and a photoconducting layer 20 overlying one electrode. A thin matrix layer 10 is obtained by heating the coated substrates 15 to a temperature above the fusion temperature of the matrix material and pressing a small glass bead containing a reducible metal ion and mobile anion between the heated parts. For a lead fluoride glass of the group set forth above, a fusion temperature of about 600° C. is satisfactory. After annealing at about 200° C. and cooling, an amorphous matrix material is obtained between the photoconductor layer 20 and the electrode layer 32. When an electro-optical device such as disclosed in FIGS. 3 and 4 is desired, the substrates coated with electronic and photoconducting material can be engraved or etched to remove portions of these coatings, thus exposing an insulating substrate. The operating temperature of the reactive electro-optical devices according to this invention depends upon the composition of the matrix material and its thickness.

In a manner similar to the fusion bonding of the substrate and lead fluoride glass matrix, a polycrystalline reactive layer can be prepared containing lanthanum as the electron reducible metal and fluoride mobile anions. A strontium-doped polycrystalline matrix can be prepared by coprecipitating an intimate mixture of 9 mols $LaF_3$ and 1 mol $SrF_2$ from a nitrate solution, with hot-pressing of the dry compact to form a reactive layer. This is a solid solution in which the fluoride ion is transported through the matrix by the vacancy defect mechanism. Dendritic La° is formed at the negative electrode when the cell is energized.

The solid state matrix may be deposited by numerous thin film processes, including evaporation of a glassy mixture. Generally, the thinner films in a solid state matrix reduce the activation time and operating temperature for the matrix materials.

Figure 6:
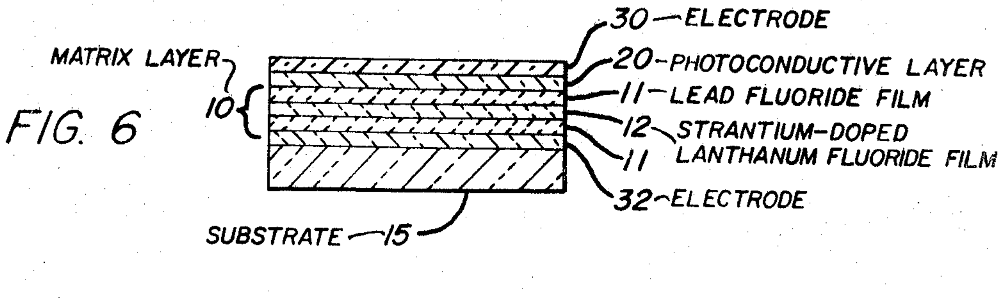

One embodiment of the invention which operates at room temperature is a composite matrix such as shown in FIG. 6. A thin electrode layer 32 is deposited on substrate 15, and a three-layer reactive matrix 10 is coated by evaporation of the matrix materials in vacuum. An intermediate film 12 of strontium-doped lanthanum fluoride is disposed between films 11 of lead fluoride. A photoconductor 20 and electrode 30 complete the electro-optical element. The role of the $LaF_3$-$SrF_2$ film is that of anionic conductor, wherein fluoride ions are mobile through film 12. In the negatively-biased $PbF_2$ layer, $Pb^{++}$ is reduced to Pb°; and in the positively-biased $PbF_2$ layer, $Pb^{++}$ is oxidized to $Pb^{+4}$. The migration of $F^-$ ions provides electrical neutrality in the layers. The matrix films 11 and 12 may be about one micron or less in thickness.

There are numerous factors which determine the degree of change in the electro-chemical and optical properties of the novel multi-layer devices. Film thickness, operating temperature, energizing voltage, incident radiation flux, and materials of construction for the electrodes, photoconductor, and reactive matrix. Multi-layer devices have been found to respond to a wide range of voltage. Each electro-optical device will have a threshold voltage to cause oxidation-reduction reactions and a maximum applied voltage related to cell breakdown. These limits vary depending on the composition of the several layers. For example, 1.5 to 5 volts D.C. is a practical source of energy for activating most devices. The electrochemical reactions in the solid state matrix can occur from ambient room temperature up to several hundred degrees.

The selector of materials for any specific electro-optical element should consider possible reactions between materials in adjacent layers which would affect the electrical operation or optical properties of the device. Where the resolution requirements of a scanning-type device are high, it may be desirable to insulate the various layers and discrete portions of the layers from one another. This can usually be achieved by evaporating an insulator material such as silica or magneisum fluoride through a mask to produce a desired insulating pattern.

While the invention has been described and explained by specific embodiments, there is no intention to limit the inventive concept except as set forth in the following claims.

I claim:

1. An optical element comprising:

a solid state layer of ionic conducting material including a solid matrix having a mobile anion in the matrix and an electrolytically-reducible metal ion in the matrix;

a layer of photoconducting material contacting the ionic layer, the photoconducting material having increased electronic conductance with increasing electromagnetic radiation; and electrical means for applying an electrical potential to the photo-conductive layer and the ionic layer;

whereby the photoconductive layer conducts electrons to the ionic layer when exposed to radiation and the metal ion is reduced to change optical characteristics of the element.

2. The optical element of claim 1 wherein the matrix comprises $Pb^{++}$ ions and $F^-$ ions.

3. The optical element of claim 2 wherein the matrix consists essentially of an amorphous material containing $PbF_2$ and Pb O.

4. The optical element of claim 3 wherein the amorphous material is a glass selected from the group consisting of $PbO\cdot(90.5)PbF_2\cdot SiO_2$;

$$PbO\cdot(0.5)PbF_2\cdot(0.5)B_2O_3 \text{ and}$$
$$PbO\cdot(0.5)PbF_2\cdot(0.5)SiO_2\cdot(0.25)B_2O_3.$$

5. The optical element of claim 1 wherein the matrix comprises a thin crystalline layer of $PbF_2$.

6. The optical element of claim 5 wherein the matrix comprises a multilayer ionic conductor having an intermediate $LaF_3$-$SrF_2$ film between films of $PbF_2$.

7. The optical element of claim 1 wherein the electrical means includes electrode layers arranged to permit selective electrical connection to individual areas of the photoconducting and ionic layers.

8. The optical element of claim 7 wherein a first electrode layer comprises parallel conducting strips and a second electrode layer comprises parallel conducting strips in a direction transverse to the first electrode layer strips.

9. The optical element of claim 1 wherein the photoconducting layer includes a material which conducts electrons in response to infrared radiation.

10. The optical element of claim 9 wherein the photoconducting layer includes a thin film of germanium.

11. An electro-optical storage device comprising in combination:

a solid state electrical storage matrix containing an electrolytically-reducible metal ion and a mobile anion;

a photoconducting material contacting the matrix, said photoconducting material being responsive to radiation incident theron;

electrical means for applying an electrical potential to the photoconducting layer and solid state matrix whereby an electrical potential is developed in the solid state matrix which developed potential is a function of the amount of incident radiation and applied electrical potential; and electro-optical means for scanning the developed potential in portions of the storage device.

12. The storage device of claim 11 wherein the scanning means and electrical means include parallel coordinate electrodes disposed in transverse arrangement on opposite sides of the photoconducting material and matrix.

13. The electro-optical storage device of claim 11 wherein the matrix contains lanthanum ions and fluoride ions.

14. The electro-optical storage device of claim 11 wherein the matrix contains lead ions and fluoride ions.

15. A method for converting invisible electromagnetic rays to a visible display comprising:

(a) directing the invisible rays toward an optical element having a photoconducting layer contacting an ionic conducting layer, said ionic layer comprising a solid matrix having a reducible metal ion and a mobile anion, and said photoconducting layer being conductive to electrons in response to the invisible radiation;

(b) biasing the photoconducting layer and the ionic layer with an electrical potential sufficient to electrolytically reduce the metal ion whereby the visible optical properties of the optical element are changed in response to the invisible radiation and the electrical potential; and (c) illuminating the optical element with visible radiation to produce a visual display.

16. The method of claim 15 wherein the invisible rays include infra-red waves.

17. The method of claim 15 wherein the ionic layer comprises lead ions and fluoride ions in the matrix.

18. An optical element comprising:

a layer of ionic conducting material containing a solid matrix, a mobile anion in the matrix, and a metal ion with intermediate valence state in the matrix, said metal having higher and lower valence states available;

a layer of photoconducting material having increased electronic conductance with increasing incident electromagnetic radiation, said photoconducting layer contacting the ionic-conducting layer;

electrode layers of electronic-conducting material contacting the photoconducting layer and ionic-conducting layer; and means for applying an electrical potential, to the electrode layers, whereby the photoconductive layer conducts electrons to the matrix when exposed to radiation and the metal valence is changed from intermediate to high and low valence states adjacent the electrodes.

References Cited

UNITED STATES PATENTS

| | | | |
|---|---|---|---|
| 3,153,113 | 10/1964 | Flanagan et al. | 350—160 |
| 3,303,488 | 2/1967 | Anderson | 350—160 X |
| 3,439,174 | 4/1969 | Snaper | 250—213 |

OTHER REFERENCES

Williams: Physical Review; vol. 126, No. 2, Apr. 15, 1962 (pp. 442–446).

WALTER STOLWEIN, Primary Examiner

U.S. Cl. X.R.

340—173; 346—74